(12) United States Patent
Kerai et al.

(10) Patent No.: US 12,197,962 B1
(45) Date of Patent: *Jan. 14, 2025

(54) RESEGMENTING CHUNKS OF DATA BASED ON ONE OR MORE CRITERIA TO FACILITATE LOAD BALANCING

(71) Applicant: SPLUNK INC., San Francisco, CA (US)

(72) Inventors: Jag Kerai, San Francisco, CA (US); Anish Shrigondekar, Sunnyvale, CA (US); Mitchell Blank, Jr., San Francisco, CA (US); Hasan Alayli, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,728

(22) Filed: Feb. 15, 2023

Related U.S. Application Data

(63) Continuation of application No. 17/237,904, filed on Apr. 22, 2021, now Pat. No. 11,599,396, which is a continuation of application No. 16/703,236, filed on Dec. 4, 2019, now Pat. No. 11,016,821, which is a continuation of application No. 15/420,590, filed on Jan. 31, 2017, now Pat. No. 10,545,798.

(51) Int. Cl.
*G06F 9/50* (2006.01)
*G06F 3/06* (2006.01)

(52) U.S. Cl.
CPC .......... *G06F 9/5083* (2013.01); *G06F 3/0604* (2013.01); *G06F 3/064* (2013.01); *G06F 3/0683* (2013.01)

(58) Field of Classification Search
CPC ...... G06F 9/5083; G06F 3/0604; G06F 3/064; G06F 3/0683
See application file for complete search history.

(56) References Cited

U.S. PATENT DOCUMENTS

| 7,937,344 B2 | 5/2011 | Baum et al. |
| 8,112,425 B2 | 2/2012 | Baum et al. |
| (Continued) | | |

OTHER PUBLICATIONS

Splunk, "Splunk Enterprise 8.0.0 Overview", available online, retrieved May 20, 2020 from docs.splunk.com, 17 pages.
(Continued)

*Primary Examiner* — Jorge A Chu Joy-Davila
(74) *Attorney, Agent, or Firm* — Artegis Law Group, LLP

(57) ABSTRACT

Resegmenting chunks of data for load balancing is disclosed. A plurality of first chunks of data is received. The plurality of first chunks of data includes one or more entries that include raw data produced by a component of an information technology environment and that reflects activity in the information technology environment. The plurality of first chunks of data is resegmented into a plurality of second chunks of data based on a source type of the plurality of first chunks. A first subset of the plurality of second chunks of data is distributed to a first indexer of a set of indexers. An occurrence of a trigger event is determined, and in response to the trigger event, a second subset of the plurality of second chunks of data is distributed to a second indexer of the set of indexers.

20 Claims, 16 Drawing Sheets

(56) References Cited

U.S. PATENT DOCUMENTS

| | | | |
|---|---|---|---|
| 8,515,963 B1* | 8/2013 | Blank, Jr. | G06F 16/316 |
| | | | 707/741 |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 9,483,579 B2 | 11/2016 | Marquess et al. | |
| 10,127,258 B2 | 11/2018 | Lamas et al. | |
| 2008/0022209 A1 | 1/2008 | Lyle | |
| 2010/0180337 A1 | 7/2010 | Bajekal | |
| 2013/0042008 A1 | 2/2013 | Das et al. | |
| 2013/0332446 A1 | 12/2013 | Zhou et al. | |
| 2014/0236889 A1 | 8/2014 | Vasan et al. | |
| 2015/0319234 A1 | 11/2015 | Wang et al. | |
| 2015/0332010 A1 | 11/2015 | Olson et al. | |
| 2015/0347523 A1 | 12/2015 | Patel et al. | |
| 2016/0162197 A1* | 6/2016 | Effern | G06F 3/0623 |
| | | | 711/154 |
| 2017/0060469 A1* | 3/2017 | Luby | H03M 13/2906 |
| 2017/0139996 A1* | 5/2017 | Marquardt | G06F 16/951 |
| 2017/0220256 A1 | 8/2017 | Balasubramonian et al. | |
| 2018/0095782 A1 | 4/2018 | Driever et al. | |
| 2019/0098106 A1 | 3/2019 | Mungel et al. | |

OTHER PUBLICATIONS

Splunk, "Splunk Cloud 8.0.2004 User Manual", available online, retrieved May 20, 2020 from docs.splunk.com, 66 pages.

Splunk, "Splunk Quick Reference Guide", updated 2019, available online at https://www.splunk.com/pdfs/solution-guides/splunk-quick-reference-guide.pdf, retrieved May 20, 2020, 6 pages.

Carasso, David, "Exploring Splunk," published by CITO Research, New York, NY, Apr. 2012, 156 pages.

Bitincka et al., "Optimizing Data Analysis with a Semi-Structured Time Series Database," self-published, first presented at "Workshop on Managing Systems via Log Analysis and Machine Learning Techniques (SLAML)", Vancouver, British Columbia, Oct. 3, 2010, 9 pages.

* cited by examiner

RESEGMENTING CHUNKS OF DATA BASED ON ONE OR MORE CRITERIA TO FACILITATE LOAD BALANCING

CROSS-REFERENCE OF RELATED APPLICATIONS

This application is a continuation of U.S. Pat. No. 17,237,904 filed Apr. 22, 2021, titled "RE-SEGMENTING CHUNKS OF DATA BASED ON SOURCE TYPE TO FACILITATE LOAD BALANCING," which is a continuation of application Ser. No. 16/703,236, filed Dec. 4, 2019, titled "RE-SEGMENTING CHUNKS OF DATA FOR EFFICIENT LOAD BALANCING ACROSS INDEXERS", issued as U.S. Pat. No. 11,016,821, which is a continuation of application Ser. No. 15/420,590, filed Jan. 31, 2017, titled "RE-SEGMENTING CHUNKS OF DATA FOR EFFICIENT LOAD BALANCING ACROSS INDEXERS" issued as U.S. Pat. No. 10,545,798." The entire contents of the aforementioned are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNICAL FIELD

The embodiments relate generally to distribution of chunks of data that contain machine data and, in particular, to resegmenting chunks of data to facilitate load balancing the chunks of data across a set of indexers.

BACKGROUND

Modern data centers and other computing environments can include anywhere from a few host computer systems to thousands of computer systems configured to process data, service requests from remote clients, and perform numerous other computational tasks. During operation, various components within these computing environments often generate significant volumes of machine-generated data.

SUMMARY

The embodiments resegment chunks of data that contain one or more entries to align at least some of the chunks of data with entry boundaries. The resegmented chunks of data facilitate load balancing the chunks of data among a set of indexers, which, among other advantages, may increase throughput and search performance.

In one example, a method is provided. The method includes receiving a plurality of first chunks of data, the plurality of first chunks of data including one or more entries that include raw data produced by a component of an information technology environment and that reflects activity in the information technology environment. The method further includes resegmenting the plurality of first chunks of data into a plurality of second chunks of data based on entry boundaries in at least some of the plurality of first chunks of data. The method includes distributing a first subset of the plurality of second chunks of data to a first indexer of a set of indexers. The method includes determining an occurrence of a trigger event and, in response to the trigger event, distributing a second subset of the plurality of second chunks of data to a second indexer of the set of indexers.

In another embodiment, a computing device is provided. The computing device includes a processor device and a first storage device having instructions stored thereon. The instructions, when executed by the processor device, cause the computing device to receive a plurality of first chunks of data, the plurality of first chunks of data including one or more entries that include raw data produced by a component of an information technology environment and that reflects activity in the information technology environment. The instructions further cause the computing device to resegment the plurality of first chunks of data into a plurality of second chunks of data based on entry boundaries in at least some of the plurality of first chunks of data. The instructions further cause the computing device to distribute a first subset of the plurality of second chunks of data to a first indexer of a set of indexers. The instructions further cause the computing device to determine an occurrence of a trigger event and, in response to the trigger event, distribute a second subset of the plurality of second chunks of data to a second indexer of the set of indexers.

In another embodiment, a non-transitory computer-readable medium containing instructions is provided. Execution of the instructions in a computing device causes the computing device to receive a plurality of first chunks of data, the plurality of first chunks of data including one or more entries that include raw data produced by a component of an information technology environment and that reflects activity in the information technology environment. Execution of the instructions further causes the computing device to resegment the plurality of first chunks of data into a plurality of second chunks of data based on entry boundaries in at least some of the plurality of first chunks of data. Execution of the instructions further causes the computing device to distribute a first subset of the plurality of second chunks of data to a first indexer of a set of indexers. Execution of the instructions further causes the computing device to determine an occurrence of a trigger event and, in response to the trigger event, distribute a second subset of the plurality of second chunks of data to a second indexer of the set of indexers.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
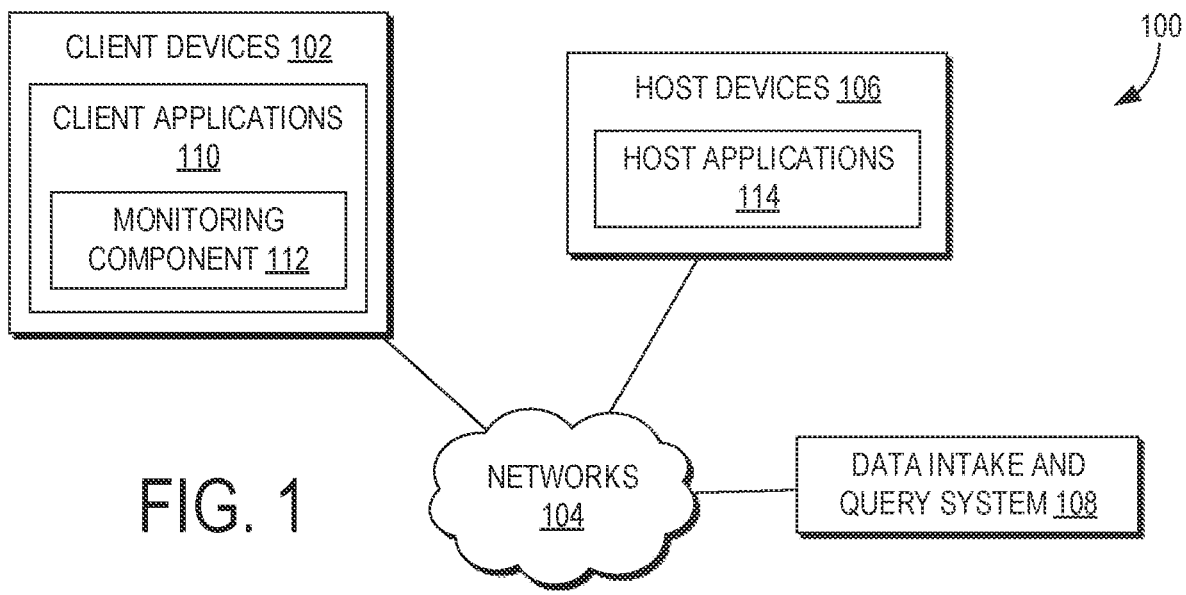
FIG. 1 is a block diagram that illustrates a networked computer environment in which an embodiment may be implemented.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first chunk" and "second chunk," and does not imply a priority, a type, an importance, or other attribute, unless otherwise stated herein.

As used herein and in the claims, the articles "a" and "an" in reference to an element refers to "one or more" of the element unless otherwise explicitly specified.

1.0. General Overview

Modern data centers and other computing environments can include anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events." An event comprises a portion of the machine-generated data and is associated with a specific point in time. For example, events may be derived from "time series data," where the time series data includes a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time, it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.) and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data." In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as Internet Protocol (IP) address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression wherein a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE," filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in FIG. 1) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
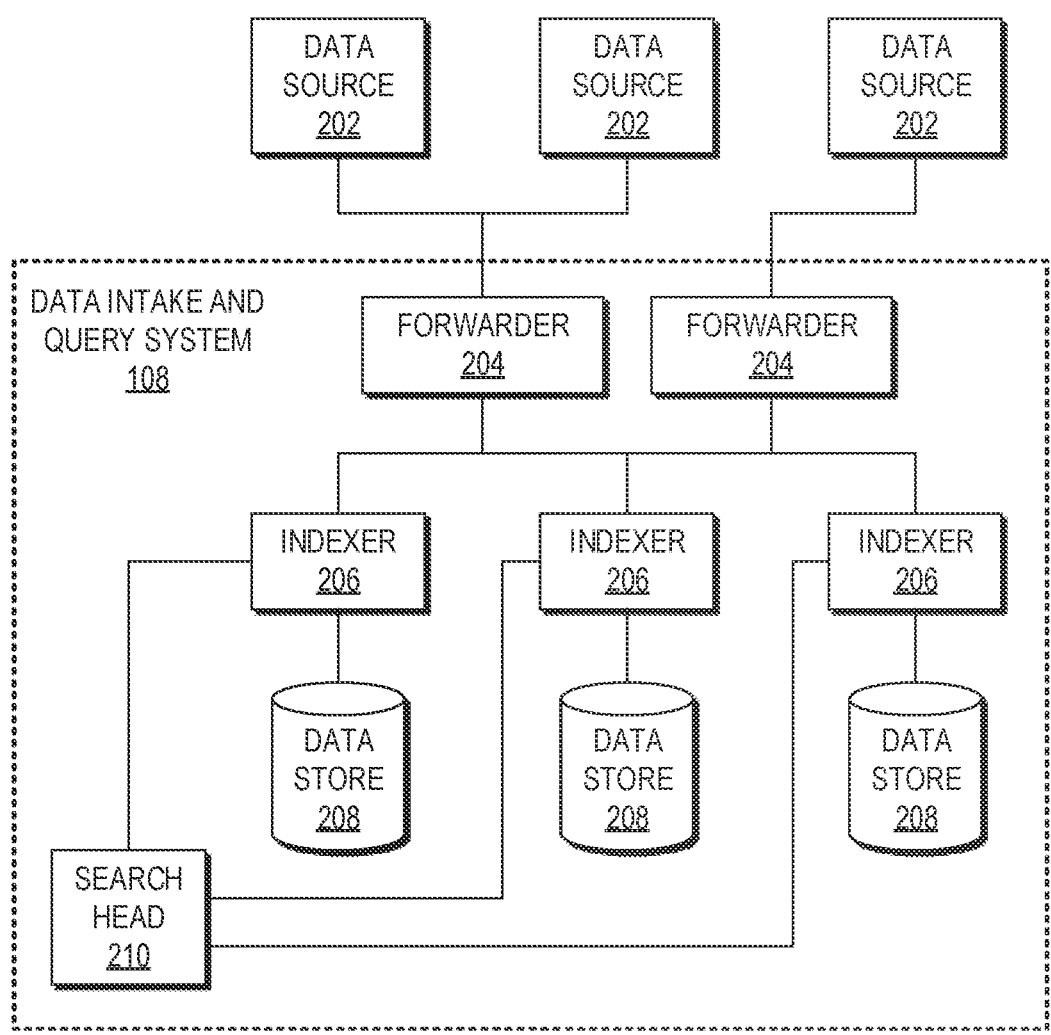
FIG. 2 is a block diagram that illustrates an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations. In the embodiments disclosed herein, the forwarders 204 may resegment chunks of data received from a data source 202.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate timestamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
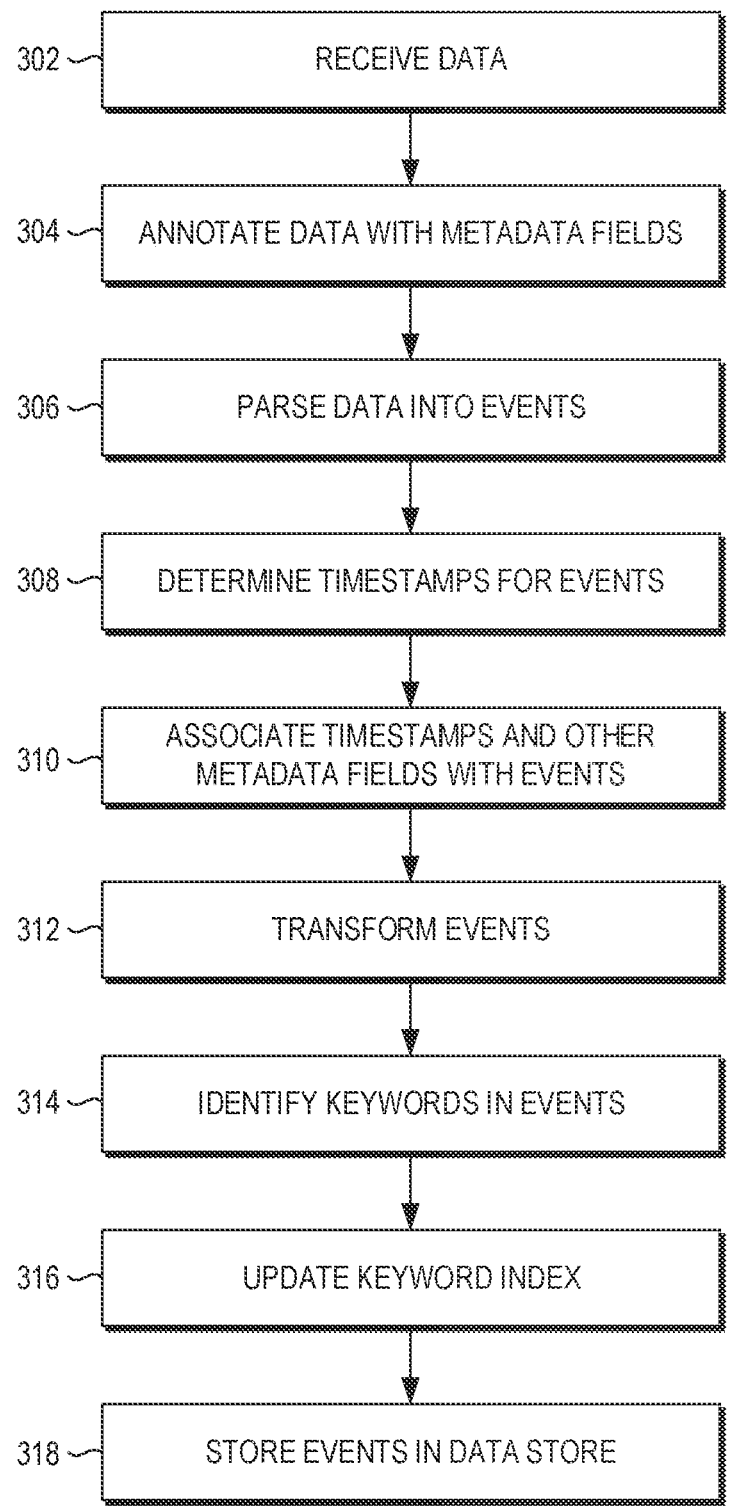
FIG. 3 is a flowchart that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks," or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. The SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a timestamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize a data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "Site-Based Search Affinity," filed on 30 Apr. 2014, and in U.S. patent application Ser. No. 14/266,817, entitled "Multi-Site Clustering," also filed on 30 Apr. 2014, each of which is hereby incorporated by reference in its entirety for all purposes.

2.6. Query Processing

Figure 4:
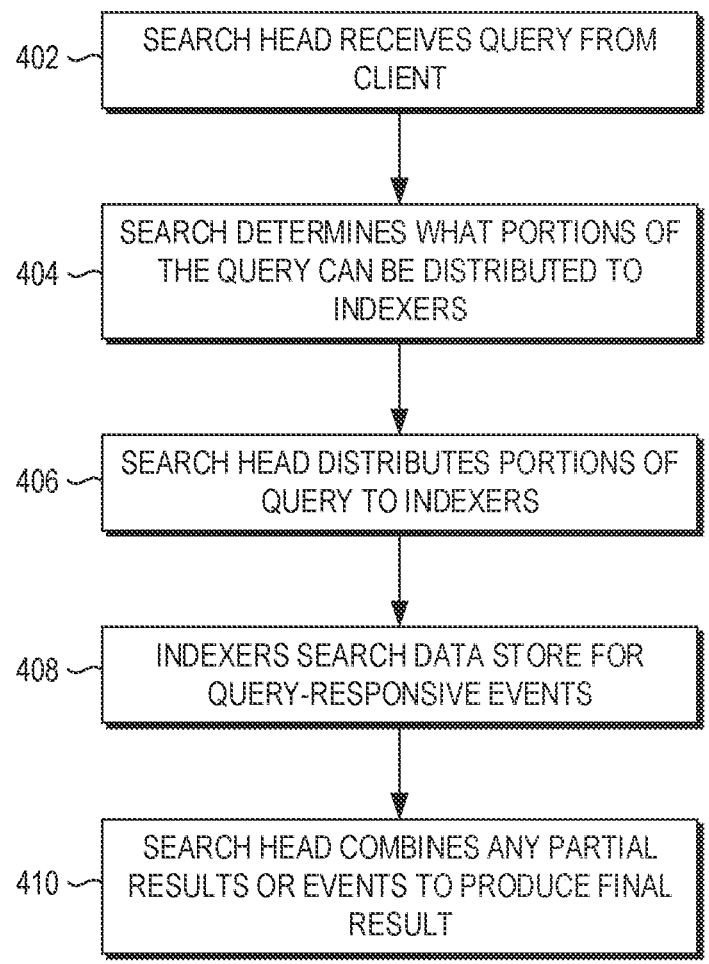
FIG. 4 is a flowchart that illustrates how a search head and the indexers perform a search query in accordance with the disclosed embodiments.

FIG. 4 is a flow diagram that illustrates an example process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in FIG. 4) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "I" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store or to a subset of the events that have been filtered based on some criteria (e.g., event timestamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
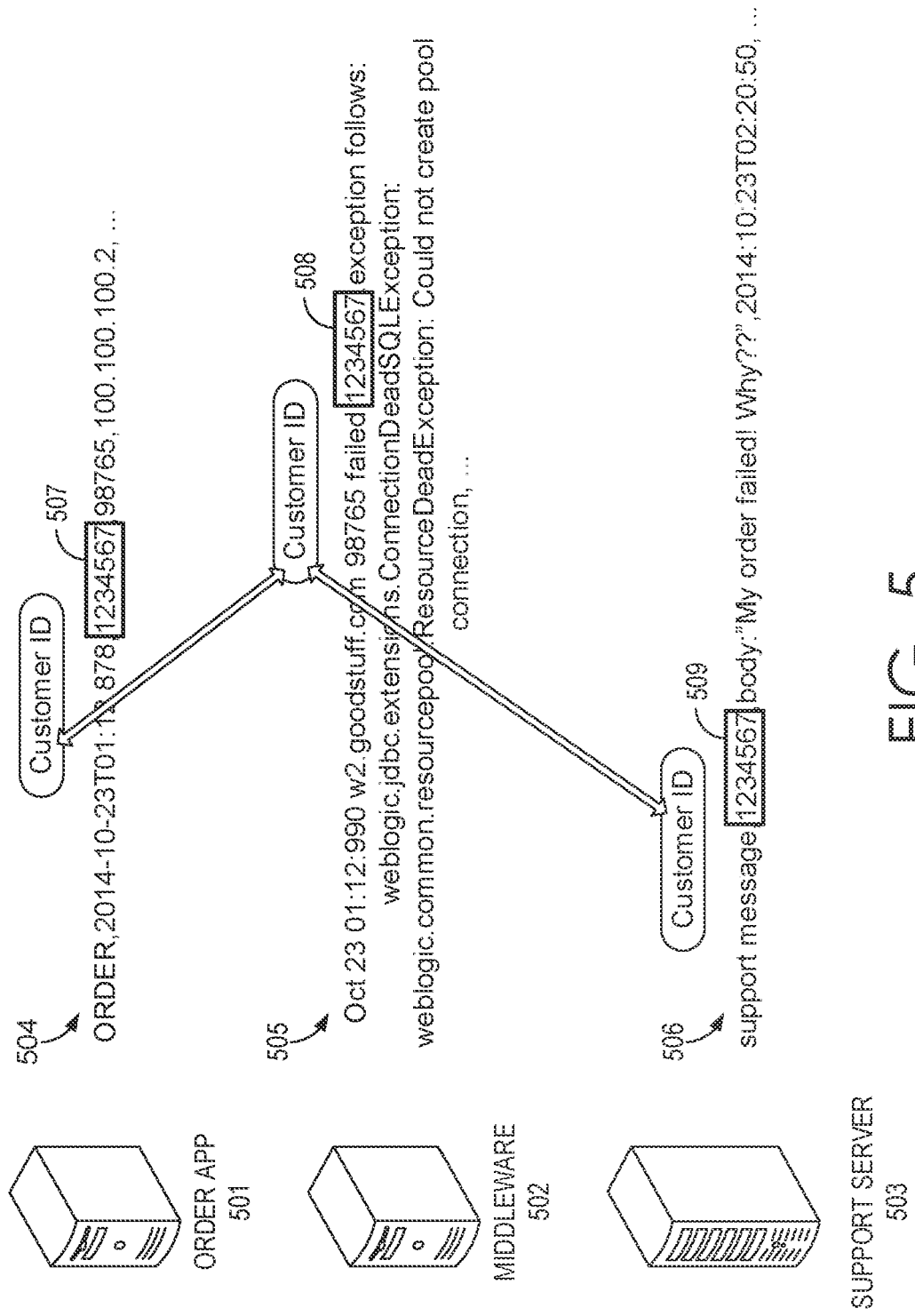
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the support server 503 to complain about the order failing to complete. The three systems 501, 502, and 503 are disparate systems that do not have a common logging format. The shopping application program 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems, the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

Figure 6:
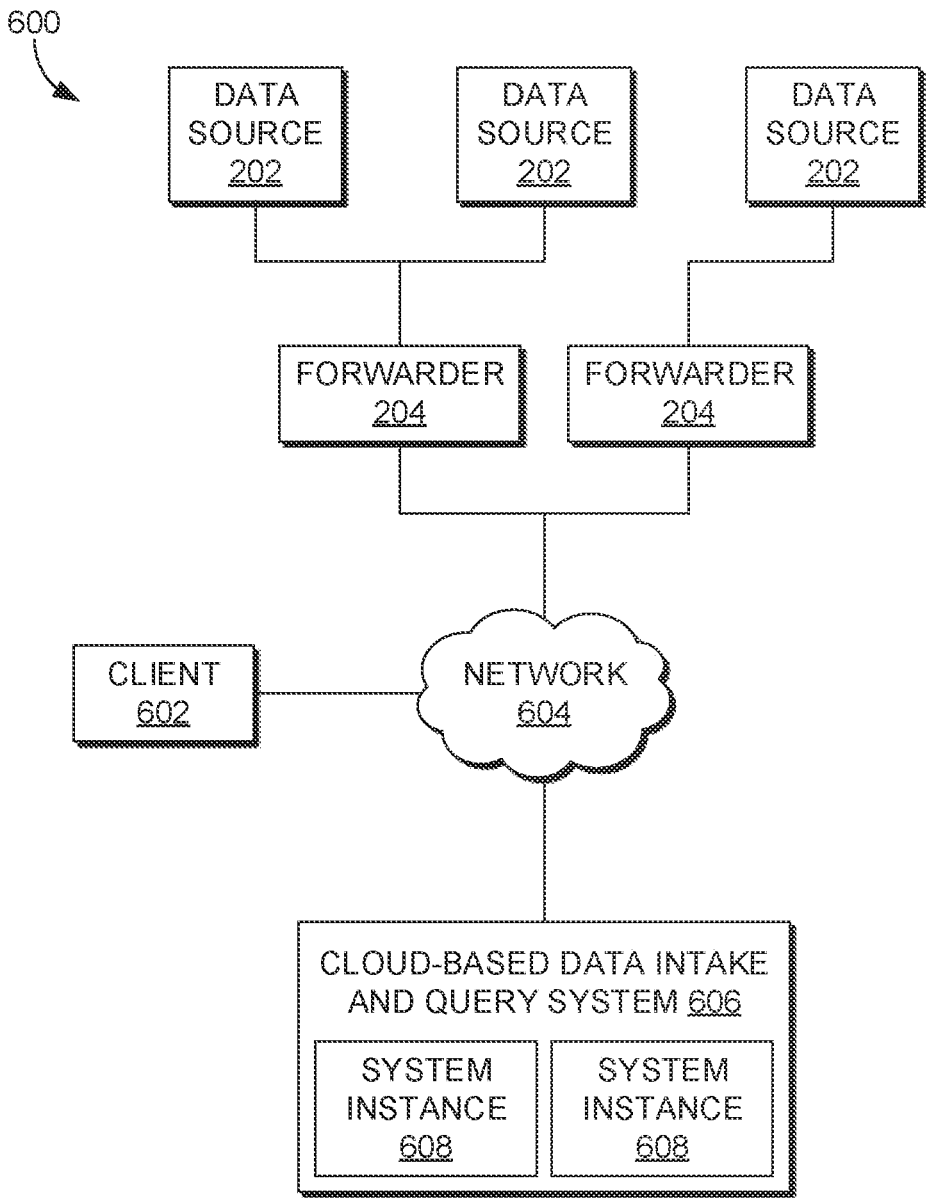
FIG. 6 illustrates a block diagram of an example cloud-based data intake and query system in which an embodiment may be implemented.

FIG. 6 illustrates a block diagram of an example cloud-based data intake and query system. Similar to the system of FIG. 2, the networked computer system 600 includes input data sources 202 and forwarders 204. These input data sources 202 and forwarders 204 may be in a subscriber's private computing environment. Alternatively, they might be directly managed by the service provider as part of the cloud service. In the example system 600, one or more forwarders 204 and client devices 602 are coupled to a cloud-based data intake and query system 606 via one or more networks 604. Network 604 broadly represents one or more LANs, WANs, cellular networks, intranetworks, internetworks, etc., using any of wired, wireless, terrestrial microwave, satellite links, etc., and may include the public Internet, and is used by client devices 602 and forwarders 204 to access the system 606. Similar to the system 108, each of the forwarders 204 may be configured to receive data from an input source and to forward the data to other components of the system 606 for further processing.

In an embodiment, a cloud-based data intake and query system 606 may comprise a plurality of system instances 608. In general, each system instance 608 may include one or more computing resources managed by a provider of the cloud-based system 606 made available to a particular subscriber. The computing resources comprising a system instance 608 may, for example, include one or more servers or other devices configured to implement one or more forwarders, indexers, search heads, and other components of a data intake and query system, similar to the system 108. As indicated above, a subscriber may use a web browser or other application of a client device 602 to access a web portal or other interface that enables the subscriber to configure an instance 608.

Providing a data intake and query system as described in reference to the system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 608) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK® CLOUD are centrally visible).

2.8. Searching Externally Archived Data

Figure 7:
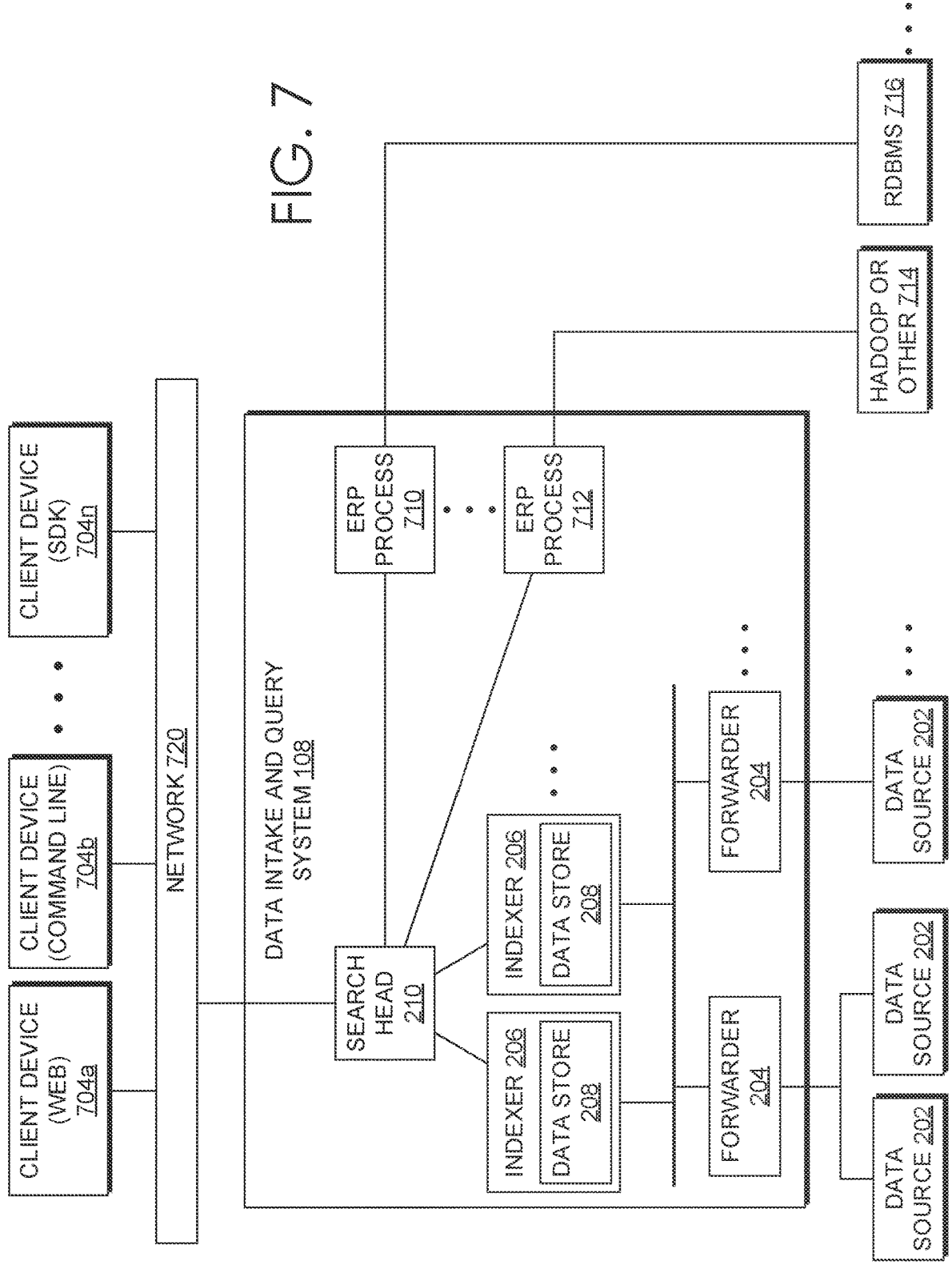
FIG. 7 illustrates a block diagram of an example data intake and query system that performs searches across external data systems in accordance with the disclosed embodiments.

FIG. 7 illustrates a block diagram of an example of a data intake and query system 108 that provides transparent search facilities for data systems that are external to the data intake and query system 108. Such facilities are available in the HUNK® system provided by Splunk Inc. of San Francisco, California. HUNK® represents an analytics platform that enables business and IT teams to rapidly explore, analyze, and visualize data in Hadoop and NoSQL data stores.

The search head 210 of the data intake and query system 108 receives search requests from one or more client devices 704 over network interface 720. As discussed above, the data intake and query system 108 may reside in an enterprise location, in the cloud, etc. FIG. 7 illustrates that multiple client devices 704a, 704b, . . . , 704n may communicate with the data intake and query system 108. The client devices 704 may communicate with the data intake and query system 108 using a variety of connections. For example, one client device in FIG. 7 is illustrated as communicating over an Internet (Web) protocol; another client device is illustrated as communicating via a command line interface; and another client device is illustrated as communicating via a system developer kit (SDK).

The search head 210 analyzes the received search request to identify request parameters. If a search request received from one of the client devices 704 references an index maintained by the data intake and query system 108, then the search head 210 connects to one or more indexers 206 of the data intake and query system 108 for the index referenced in the request parameters. That is, if the request parameters of the search request reference an index, then the search head 210 accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 710. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head 210 may access through one or more ERP processes 710, 712. FIG. 7 shows two ERP processes 710, 712 that connect to respective remote (external) virtual indices, which are indicated as a Hadoop or another system 714 (e.g., Amazon S3, Amazon EMR, other Hadoop Compatible File Systems (HCFS), etc.) and a relational database management system (RDBMS) 716. Other virtual indices may include other file organizations and protocols, such as Structured Query Language (SQL) and the like. The ellipses between the ERP processes 710, 712 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head 210 may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head 210 may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 710, 712 receive a search request from the search head 210. The search head 210 may optimize the received search request for execution at the respective external virtual index. Alternatively, the ERP process may receive a search request as a result of analysis performed by the search head 210 or by a different system process. The ERP processes 710, 712 can communicate with the search head 210 via conventional input/output routines (e.g., standard in/standard out, etc.). In this way, the ERP process receives the search request from a client device such that the search request may be efficiently executed at the corresponding external virtual index.

The ERP processes 710, 712 may be implemented as a process of the data intake and query system 108. Each ERP process may be provided by the data intake and query system 108, or may be provided by process or application providers who are independent of the data intake and query system 108. Each respective ERP process may include an interface application installed at a computer of the external result provider that ensures proper communication between the search support system and the external result provider. The ERP processes 710, 712 generate appropriate search requests in the protocol and syntax of the respective virtual indices, each of which corresponds to the search request received by the search head 210. Upon receiving search results from their corresponding virtual indices, the respective ERP process passes the result to the search head 210, which may return or display the results or a processed set of results based on the returned results to the respective client device 704.

Client devices 704 may communicate with the data intake and query system 108 through a network interface 720, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process is described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 27 May 2014, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

3.0. Load Balancing

As discussed above, a forwarder 204 (FIG. 2) obtains raw machine data from a data source 202. The data may be ingested by the forwarder 204 in discrete chunks of data based on some criteria, such as size. For example, the forwarder 204 may receive a file, such as a system log, that contains raw machine data and read the file in blocks that have a uniform block size, such as 64 kilobytes (KB), resulting in the generation of a plurality of 64 KB chunks of data. In other examples, the block size may not be uniform and may vary based on the data source 202 and/or other criteria and/or conditions. The forwarder 204 forwards the chunks of data to an indexer 206 for subsequent processing, as discussed above with regard to FIGS. 2 and 3. In other embodiments, the forwarder 204 may receive raw machine data in a continuous stream. The forwarder 204 may then generate chunks of data from the stream of data based on some criteria, such as size, to generate a plurality of chunks of data. The "chunking" of data facilitates sending the chunks in a controlled manner to a downstream process, such as the indexer 206. The chunks of data received from a data source 202 may be the same size or may be of varying sizes.

The chunks of data contain one or more entries of raw machine data. The entries have entry boundaries that can be identified based on one or more criteria, which may differ depending on the source type of the raw machine data. The initial chunking of the data, however, is typically done without regard to entry boundaries, such that chunk boundaries and entry boundaries may not align. Thus, a single entry may bridge two or more successive chunks of data. Because the chunk boundaries are independent of the entry boundaries, a forwarder 204 that has started distributing the chunks of data from a data source 202 to a first indexer 206 may not arbitrarily start sending chunks of data from the data source 202 to a second indexer 206 because the initial chunk sent to the second indexer 206 may contain an incomplete entry, and doing so may negatively impact entry integrity. This may result in unprocessed entries, which in turn negatively impacts the effectiveness of and confidence in the system. Consequently, a forwarder 204 typically sends the chunks of data from a single data source 202 to the same indexer 206 to ensure that no entries are lost and that entry integrity is maintained. However, in some circumstances, this can result in a slowdown in processing if the indexer 206 cannot process the chunks of data at the same rate that the forwarder 204 is distributing the chunks of data to the indexer 206.

Figure 8:
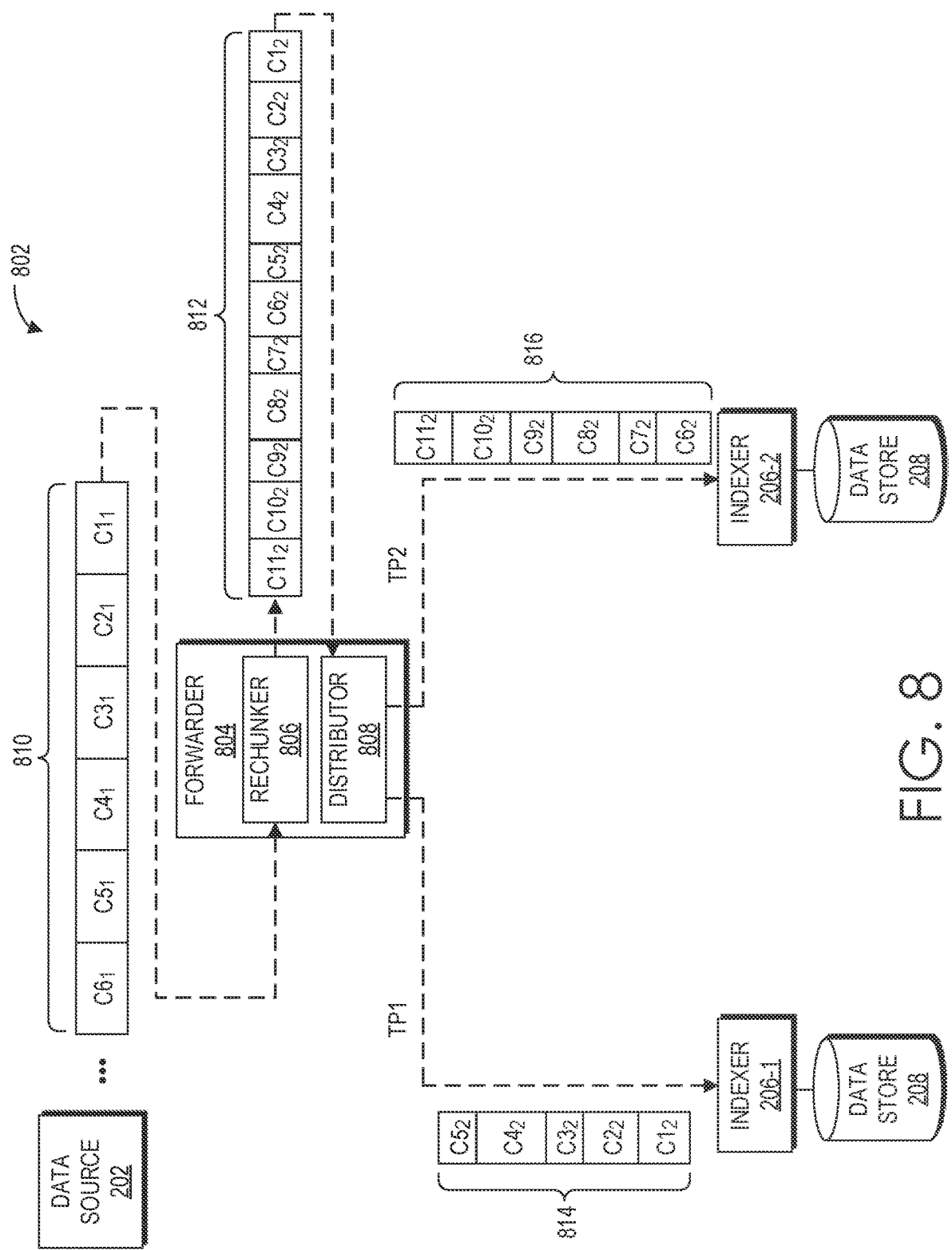
FIG. 8 is a block diagram that illustrates an environment that includes a forwarder according to one embodiment.

At times, and in particular if multiple indexers 206 are available and a relatively substantial amount of data is being obtained from a data source 202, it may be desirable to load balance the chunks of data containing raw machine data from the same data source 202 across the multiple indexers 206, for example, to improve search and indexing performance. In this regard, FIG. 8 is a block diagram that illustrates an environment 802 that includes a forwarder 804 according to one embodiment. The forwarder 804 may be substantially similar to the forwarder 204 discussed above except as otherwise discussed herein. In this embodiment, the forwarder 804 includes a rechunker 806 and a distributor 808. The rechunker 806 and the distributor 808 are part of a processing pipeline implemented by the forwarder 804, and may be two components of many other components in the processing pipeline implemented by the forwarder 804.

In this example, the forwarder 804 receives, or otherwise obtains, a plurality of first chunks of data including one or more entries that include raw data produced by a component of an information technology environment and that reflects activity in the information technology environment, as discussed above. The data source 202 may comprise, for example, a web server, an application server, a database, a firewall, a router, an operating system, a software application that executes on a computer system, a mobile device, a sensor, an Internet of Things (IoT) device, etc. The raw machine data in the first chunks of data generated by such data sources can include, for example and without limitation, data from server log files, data from activity log files, data from configuration files, messages, network packet data, performance measurements, sensor measurements, etc.

For purposes of illustration, the first chunks of data will be referred to collectively as the first chunks of data 810, and will be referred to individually by the designations on the individual first chunks of data 810 in the Figures, such as C11-C61. Thus, the plurality of first chunks of data 810 includes first chunks of data C11, C21, C31, C41, C51, and C61. In this example, the first chunks of data 810 are illustrated as being received in chunks from the data source 202, such as may occur, for example, if the forwarder 804 obtains the data from the data source 202 by reading a file in a fixed block size. In other embodiments, however, such as when the data source 202 provides a continuous stream of raw machine data to the forwarder 804, the first chunks of data 810 may be formed by a component of the forwarder 804 (not illustrated) upstream of the rechunker 806. Note that the first chunks of data 810 are formed independently of the entries contained within the first chunks of data 810, and thus, the chunk boundaries of the first chunks of data 810 do not necessarily align with entry boundaries of the one or more entries contained in each first chunk of data 810. The entries in the first chunks of data 810 may correspond to portions of raw machine data that a downstream indexer 206 may utilize to create corresponding events.

The rechunker 806 receives the first chunks of data 810 and, as will be discussed in greater detail below, resegments the first chunks of data 810 into a plurality of second chunks of data 812 based on entry boundaries in at least some of the plurality of first chunks of data 810. Again, for purposes of illustration, the second chunks of data will be referred to collectively as the second chunks of data 812, and will be referred to individually by the designations on the individual second chunks of data 812 in the Figures, such as C12-C112.

The distributor 808 accesses the second chunks of data 812, and during a first time period TP1, sends a first subset 814 of the second chunks of data 812 to a first indexer 206-1, and during a second time period TP2, sends a second subset 816 of the second chunks of data 812 to a second indexer 206-2. The distributor 808 is able to distribute the second subset 816 of the second chunks of data 812 to the second indexer 206-2, even though the second subset 816 of the second chunks of data 812 originated from the same data source 202 as the first subset 814 of the second chunks of data 812 because the second chunks of data 812 are at least in part segmented along entry boundaries. The present embodiments, among other advantages, allow relatively even distribution of chunks of data over a set of indexers 206, which in turn increases throughput as well as search performance.

Figure 9:
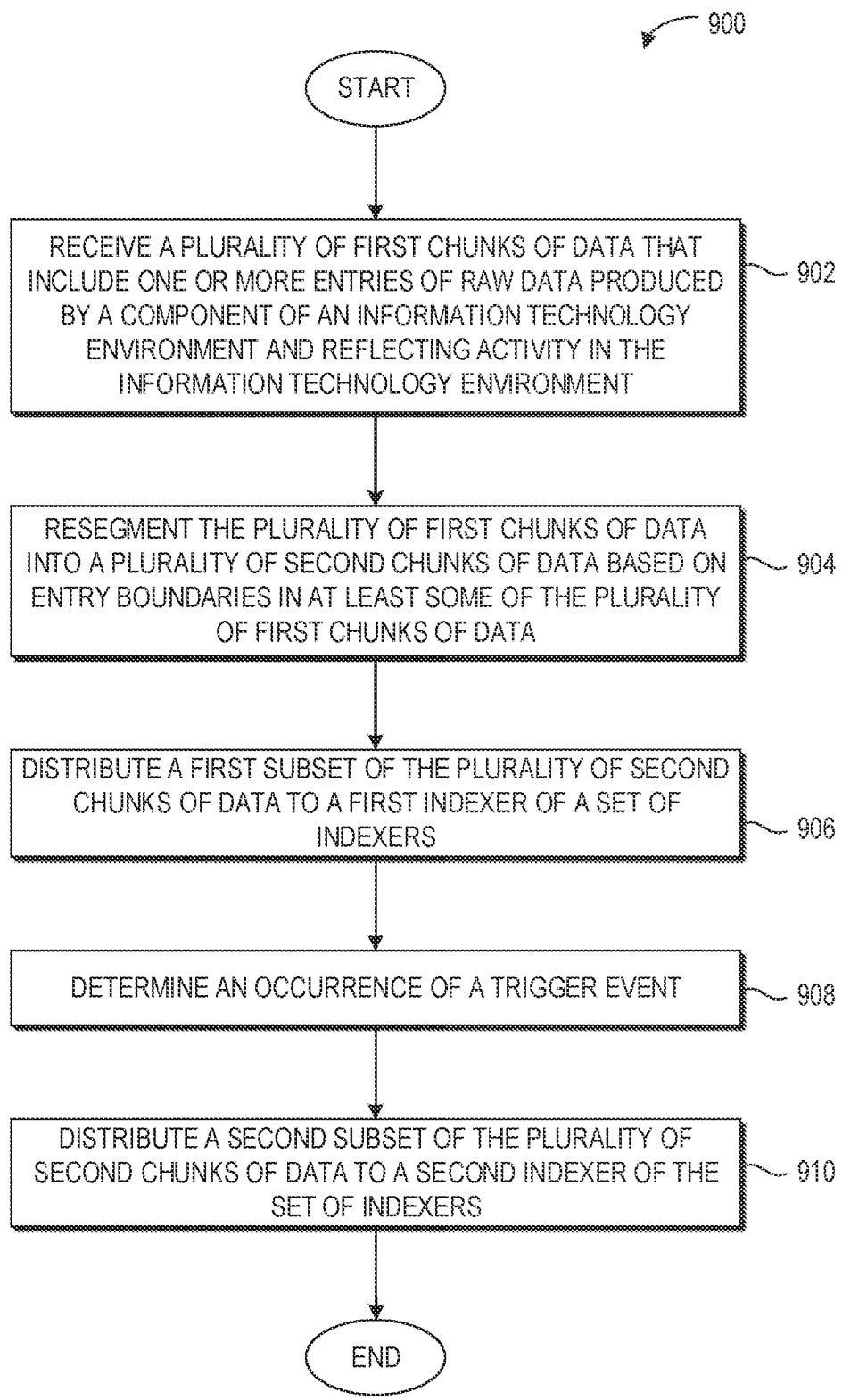
FIG. 9 is a flowchart that illustrates a method for load balancing second chunks of data across the indexers according to one embodiment.

FIG. 9 is a flowchart 900 that illustrates a method for load balancing the second chunks of data 812 across a set of indexers 206-1, 206-2 according to one embodiment. FIG. 9 will be discussed in conjunction with FIG. 8. The forwarder 804 receives the plurality of first chunks of data 810, the plurality of first chunks of data 810 including one or more entries that include raw data produced by a component of an information technology environment and that reflects activity in the information technology environment (FIG. 9, block 902). The forwarder 804, via the rechunker 806, resegments the plurality of first chunks of data 810 into the plurality of second chunks of data 812 based on entry boundaries in at least some of the plurality of first chunks of data 810 (FIG. 9, block 904).

The forwarder 804, via the distributor 808, distributes the first subset 814 of the plurality of second chunks of data 812 to the first indexer 206-1 of the set of indexers (FIG. 9, block 906). The forwarder 804 determines an occurrence of a trigger event (FIG. 9, block 908). The trigger event can include any desired event, such as the elapsing of a particular amount of time, the number of second chunks of data 812 in the first subset 814 of the second chunks of data 812, an amount of data, such as in bytes, of the second chunks of data 812 in the first subset 814 of the second chunks of data 812, or any other desired event. As will be discussed in greater detail below, the trigger event may be configurable. In response to the trigger event, the distributor 808 switches from the first indexer 206-1 to the second indexer 206-2 and distributes a second subset 816 of the second chunks of data 812 to the second indexer 206-2 of the set of indexers (FIG. 9, block 910). Note that the distribution of the second chunks of data 812 by the distributor 808 may occur at least in part concurrently in time with the resegmenting of the first chunks of data 810 by the rechunker 806.

While for purposes of illustration only two indexers 206-1, 206-2 are illustrated as being in the set of indexers 206, the embodiments may utilize any number of indexers 206, and, after having distributed a subset of the plurality of second chunks of data 812 to a last indexer 206 of a set of indexers 206, start the process over beginning with the indexer 206-1. In other examples, the set of indexers 206 may comprise more than five indexers 206, or more than 100 indexers 206, or any other number of indexers 206.

Figure 10:
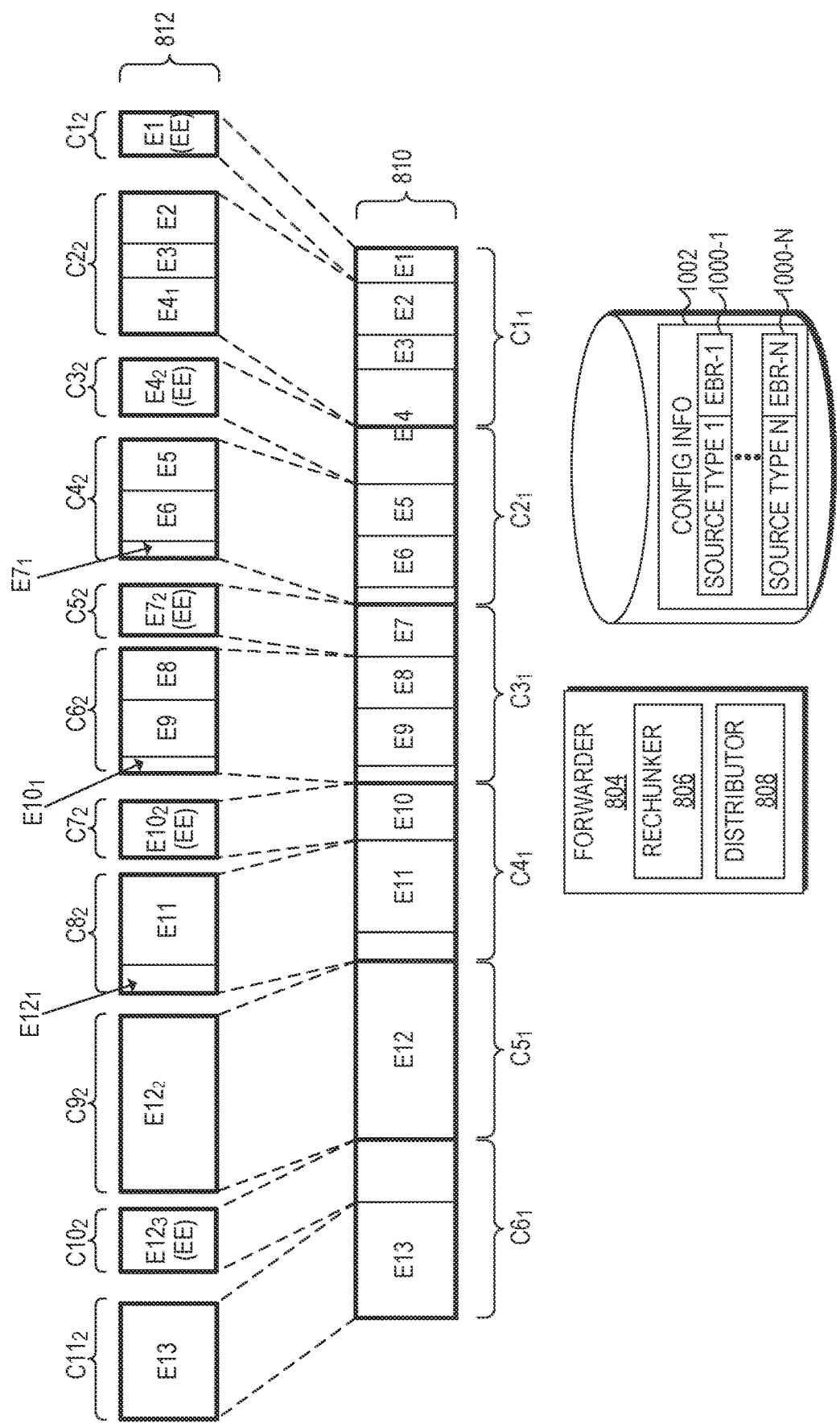
FIG. 10 is a block diagram that illustrates the resegmenting of a plurality of first chunks of data into a plurality of second chunks of data based on entry boundaries in at least some of the plurality of first chunks of data according to one embodiment.

FIG. 10 is a block diagram that illustrates the resegmenting of the plurality of first chunks of data 810 into the plurality of second chunks of data 812 based on entry boundaries in at least some of the plurality of first chunks of data 810 according to one embodiment. Initially, the rechunker 806 determines criteria that identify entry boundaries of entries contained in the plurality of first chunks of data 810. In one example, the criteria may comprise configurable entry boundary rules 1000-1-1000-N (generally, entry boundary rules 1000) maintained in a configuration information data structure 1002 in memory or on a storage device. The entry boundary rules 1000 may, in some embodiments, be based on a source type associated with the respective data source 202 from which the raw machine data in the plurality of first chunks of data 810 originated. Thus, for example, the rechunker 806 may access the entry boundary rule 1000-1 if the raw machine data from the data source 202 is an apache log file, and the rechunker 806 may access entry boundary rule 1000-N if the raw machine data from the data source 202 is system performance data. Example entry boundary rules 1000 will be discussed below. In other embodiments, the configuration information data structure 1002 may contain a single entry boundary rule 1000 that an operator configured from a plurality of different potential entry boundary rules 1000 based on knowledge of the raw machine data at issue. In some embodiments, the forwarder 804 may have two modes of operation: a first mode in which the rechunker 806 resegments the first chunks of data 810 into the second chunks of data 812, and a second mode in which the rechunker 806 is bypassed, and thus load balancing does not occur. The forwarder 804 may determine the appropriate mode, for example, based on a setting in the configuration info 1002.

The rechunker 806 accesses the first chunk C11. Note that in this example the first chunk C11 includes an entry E1, a complete entry E2, a complete entry E3, and a first portion of an entry E4. Note that the entries E1, E2, E3, and E4 are all different sizes. The rechunker 806 scans the first chunk C11 from a beginning of the first chunk C11 until the rechunker 806 finds a first entry boundary between two entries, based on a specific entry boundary rule 1000. In this example, the first entry boundary between two entries is the entry boundary between the entry E1 and the entry E2. The rechunker 806 resegments the data from the beginning of the first chunk C11 to the identified entry boundary, which in this case is the entry E1, into a second chunk C12. Because the rechunker 806 knows that the second chunk C12 ends on an entry boundary, the rechunker 806 marks the second chunk C12 as an end of entry, illustrated in the Figures with the denotation "(EE)". The marking may be done in any number of ways, such as via metadata associated with the second chunk C12 (not illustrated), via the insertion of an EE pattern in the second chunk C12, or via any other suitable mechanism that can be associated with the second chunk C12 and that can identify the second chunk C12 as an end of entry.

The rechunker 806 then resegments the data from the entry boundary of entry E2 to the end of the first chunk C11 into a second chunk C22. In other embodiments, rather than marking the second chunk C12 as an end of entry, the rechunker 806 may mark the second chunk C22 as a beginning of entry. As will be discussed in greater detail herein, the end of entry marking (or beginning of entry marking) may be utilized by the distributor 808 to switch from one indexer 206 to another indexer 206 safely at an entry boundary to ensure no entries are lost. Among other advantages, by only resegmenting the first chunks of data 810 based on the first entry boundary in each first chunk of data 810, the rechunker 806 can resegment the first chunks of data 810 relatively quickly with relatively minimal processing overhead, and yet create second chunks of data 812 that the distributor 808 can safely load balance among multiple indexers 206 without the loss of any entries.

Note that the second chunk C22 contains a complete entry E2, a complete entry E3, and a partial entry E41, which is a first portion of the entry E4. The rechunker 806 accesses the first chunk C21. The first chunk C21 includes a final portion of the entry E4, a complete entry E5, a complete entry E6, and a first portion of an entry E7. The rechunker 806 scans the first chunk C21 from a beginning of the first chunk C21 until the rechunker 806 finds a first entry boundary between two entries, based on the entry boundary rule 1000. In this example, the first entry boundary between two entries is the entry boundary between the entry E4 and the entry E5. The rechunker 806 resegments the data from the beginning of the first chunk C21 to the identified entry boundary, which in this case is the last portion of the entry E4 (E42), into a second chunk C32. Because the rechunker 806 knows that the second chunk C32 ends on an entry boundary, the rechunker 806 marks the second chunk C32 as an end of entry (EE). The rechunker 806 then resegments the data from the entry boundary of entry E5 to the end of the first chunk C21 into a second chunk C42.

The rechunker 806 similarly resegments the first chunks C31, C41, C51, and C61 into second chunks C52, C62, C72, C82, C92, C102, and C112. The second chunks C52, C72, and C102 are each marked as an end of entry. Note that the entry E12 spans three first chunks C41-C61, which results in portions of the entry E12 being in second chunks C82, C92, and C102. In this manner, the rechunker 806 resegments the first chunks of data 810 into the second chunks of data 812 based on entry boundaries in the first chunks of data 810.

Figure 11:
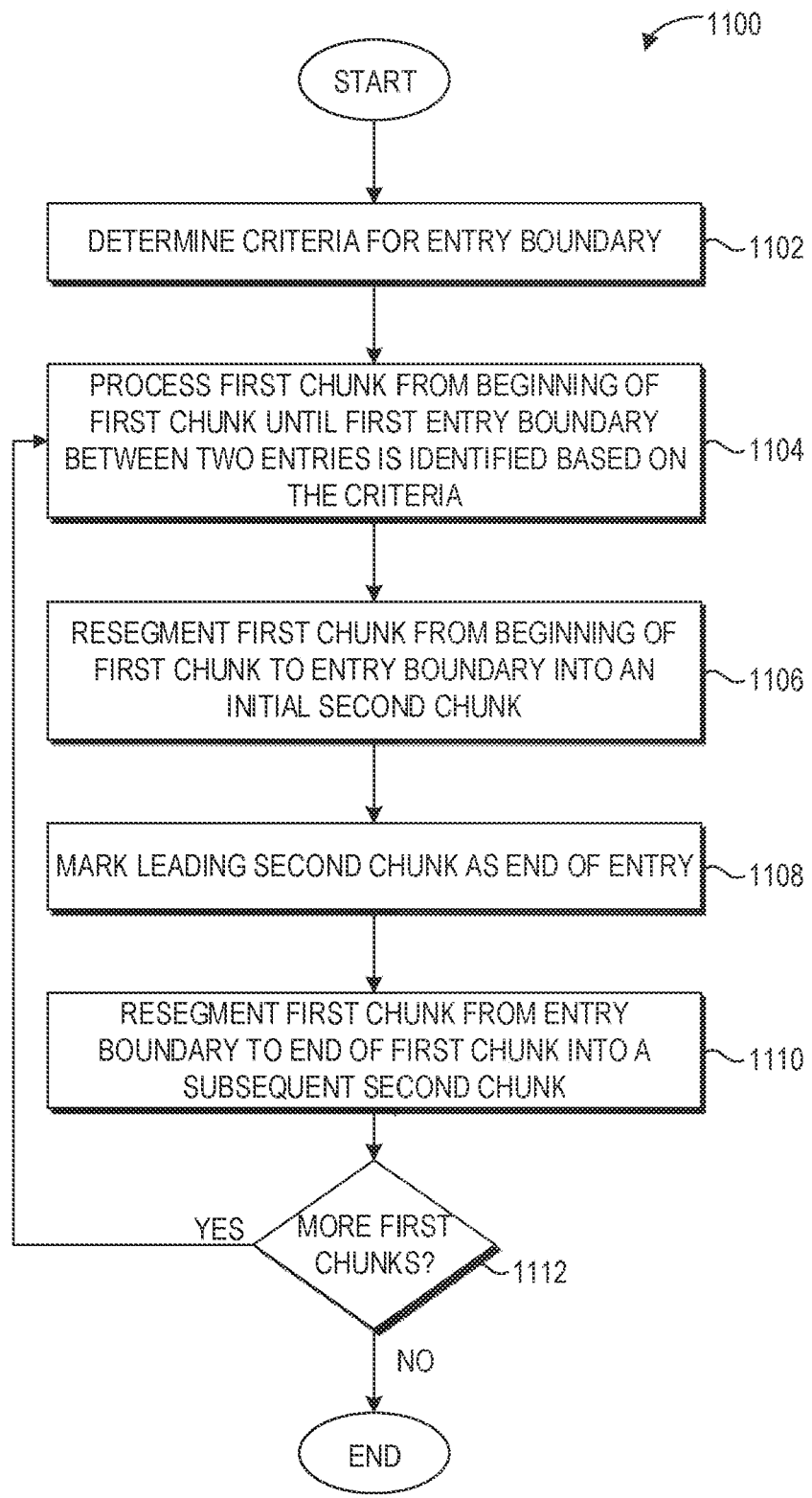
FIG. 11 is a flowchart that illustrates a method for resegmenting the plurality of first chunks of data into a plurality of second chunks of data based on entry boundaries in at least some of the plurality of first chunks of data according to one embodiment.

FIG. 11 is a flowchart 1100 that illustrates a method for resegmenting the plurality of first chunks of data 810 into the plurality of second chunks of data 812 based on entry boundaries in at least some of the plurality of first chunks of data 810 according to one embodiment. FIG. 11 will be discussed in conjunction with FIG. 10. The rechunker 806 determines the criteria for an entry boundary (FIG. 11, block 1102). In some embodiments, the rechunker 806 may access an entry boundary rule 1000 that identifies the criteria for the entry boundary. The rechunker 806 processes the first chunk C11 from the beginning of the first chunk C11 until a first entry boundary between two entries is identified based on the criteria (FIG. 11, block 1104). The rechunker 806 resegments the first chunk C1 from the beginning of the first chunk C11 to the entry boundary into the initial second chunk C12 (FIG. 11, block 1106). The rechunker 806 marks the second chunk C12 as an end of entry (FIG. 11, block 1108). The rechunker 806 resegments the first chunk C11 from the entry boundary to the end of the first chunk C11 into a subsequent second chunk C22 (FIG. 11, block 1110). The rechunker 806 repeats the process until all of the first chunks of data 810 have been resegmented into the second chunks of data 812 (FIG. 11, block 1112).

Figure 12A:
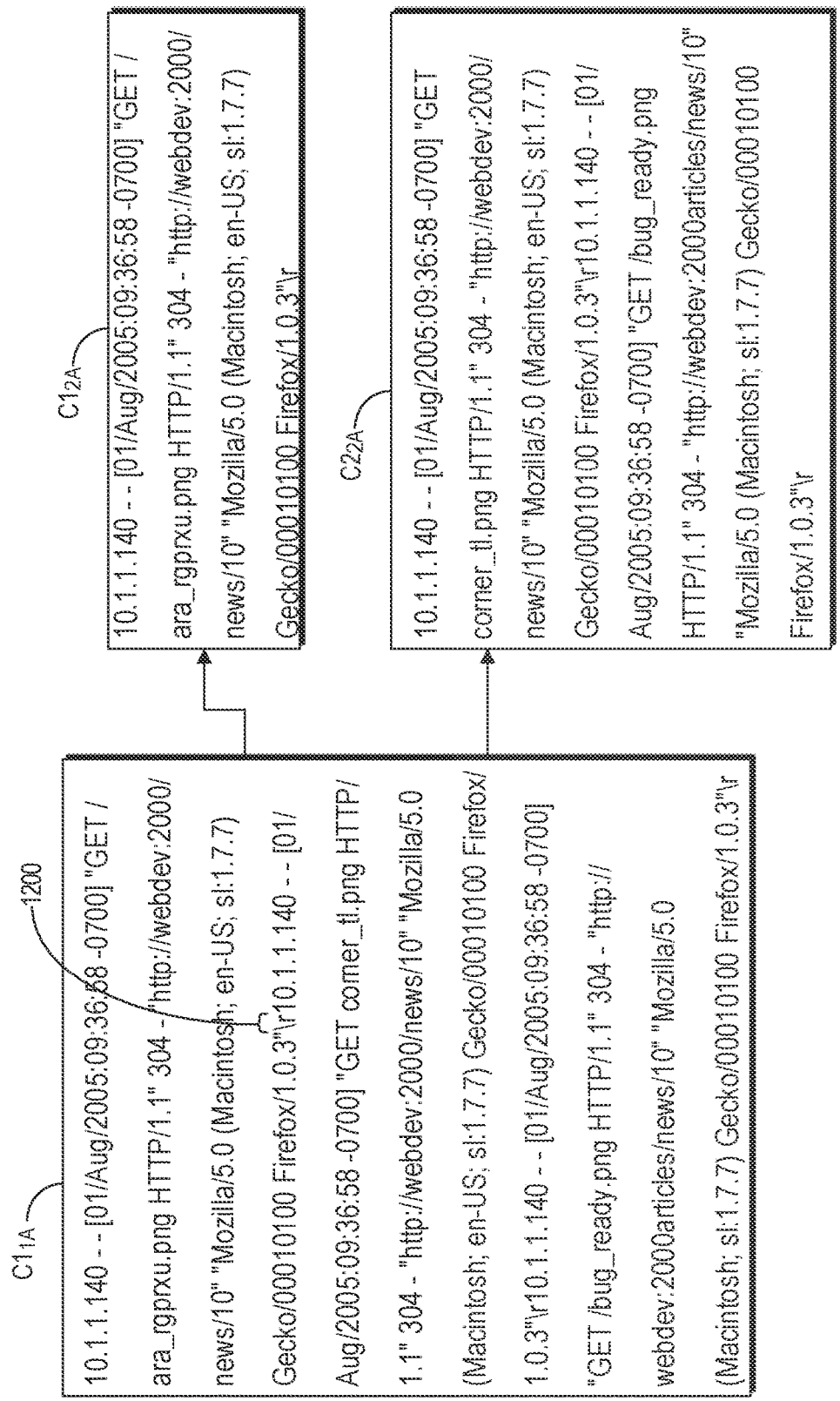
FIGS. 12A-12C illustrate the identification of entry boundaries according to some embodiments.
Figure 12B:
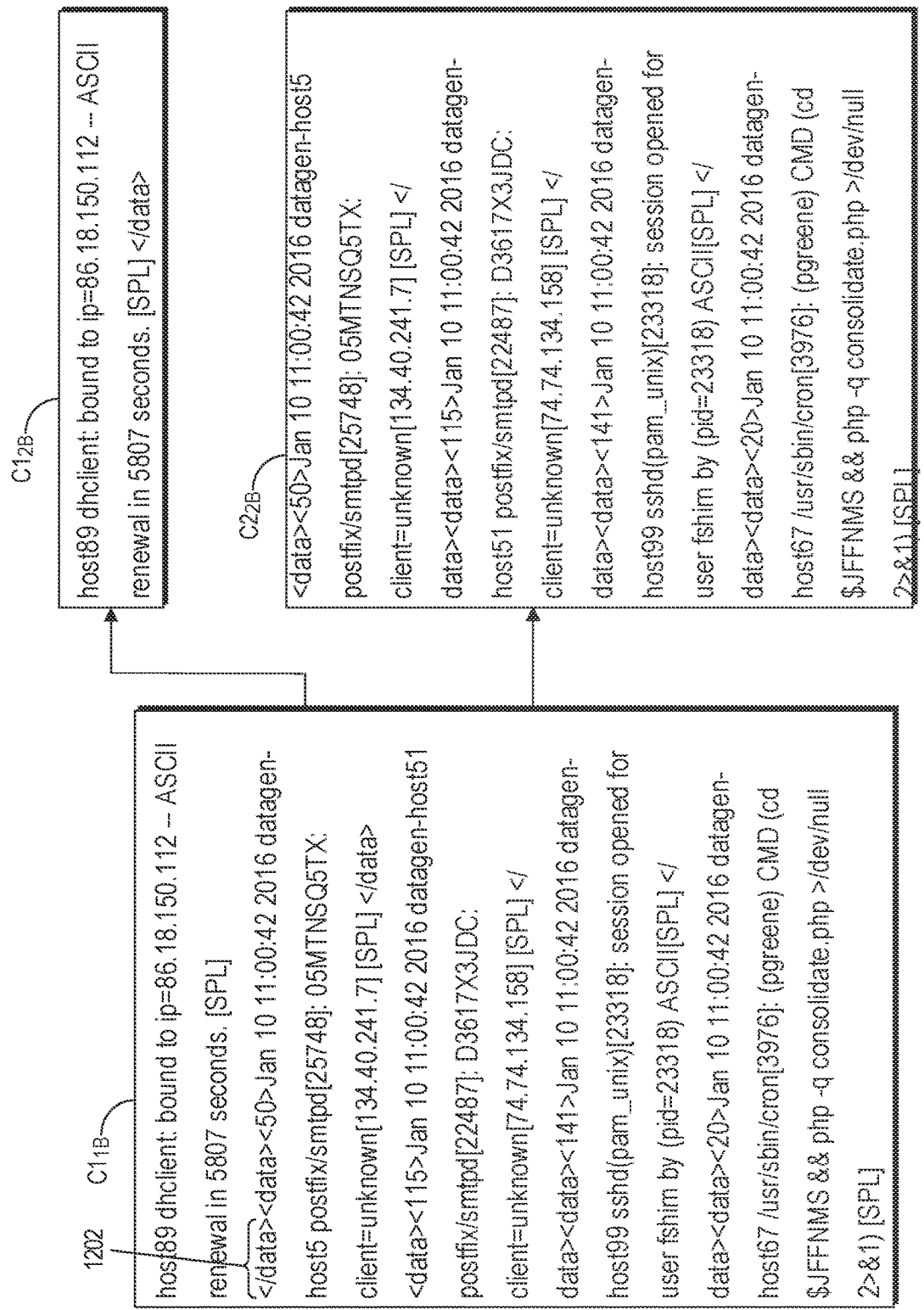
Figure 12C:
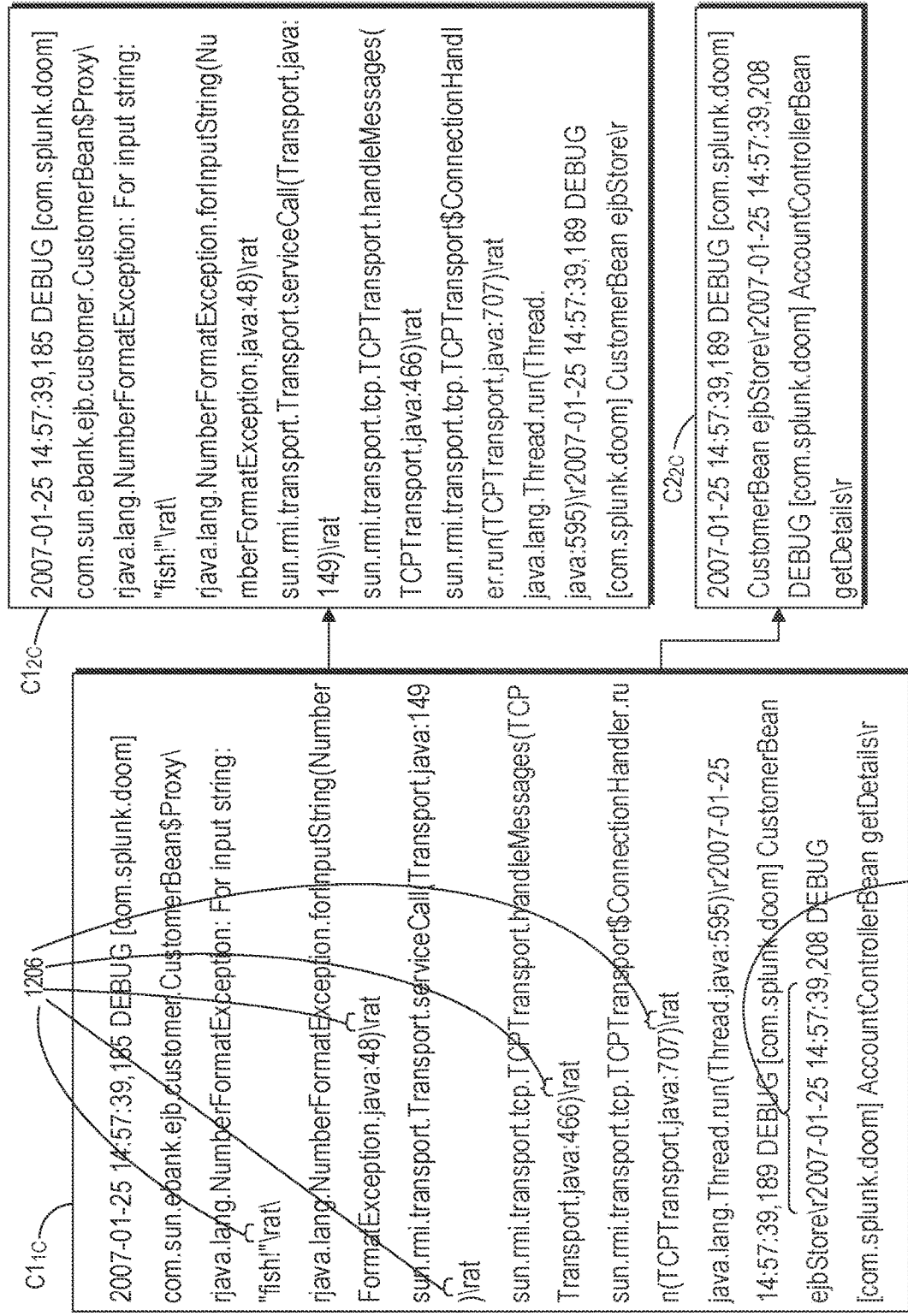

FIGS. 12A-12C illustrate examples for identifying entry boundaries in a chunk according to some embodiments. Referring first to FIG. 12A, assume that in this example the criteria for an entry boundary is a regex rule "[\r\n]+". This regex rule will match on either "\r" (carriage return) or a "\n" (line feed) or both. In this example, the rechunker 806 receives a first chunk of data C11A and, using the regex rule, determines a match of "\r" at a location 1200. The rechunker 806 resegments the first chunk of data C11A into two second chunks of data C12A and C22A. The second chunk of data C12A includes the data from the beginning of the first chunk of data C11A to, and including, the "\r". The second chunk of data C22A includes the data after the "\r" to the end of the first chunk of data C11A. The second chunk of data C12A is also marked as an end of entry (EE).

Referring now to FIG. 12B, assume that in this example the criteria for an entry boundary is a regex rule "</data>". This regex rule will match on "</data>". In this example, the rechunker 806 receives a first chunk of data C11B and, using the regex rule, determines a match of "</data>" at a location 1202. The rechunker 806 resegments the first chunk of data C11B into two second chunks of data C12B and C22B. The second chunk of data C12B includes the data from the beginning of the first chunk of data C11B to, and including, the "</data>". The second chunk of data C22B includes the data after the "</data>" to the end of the first chunk of data C11B. The second chunk of data C12B is also marked as an end of entry (EE).

Referring now to FIG. 12C, assume that in this example the criteria for an entry boundary is a regex rule "[\r\n]+)(\d\d\d\d-\d\d-\d\d\d\d?:\d\d:\d\d)". This regex rule will match on either "\r" (carriage return), a "\n" (line feed), or both, in conjunction with a sequence of digits in the following format "xxxx-XX-XX XX: XX: XX" where "x" equals any digit. In some embodiments, this may be referred to as a multiline criteria, because a carriage return or a line feed, by itself, will not mark the boundary of an entry. In this example, the rechunker 806 receives a first chunk of data C11C and, using the regex rule, determines a match of "([\r\n]+)(\d\d\d\d-\d\d-\d\d\d\d?:\d\d:\d\d)" at a location 1204. The rechunker 806 resegments the first chunk of data C11C into two second chunks of data C12C and C22C. The second chunk of data C12C includes the data from the beginning of the first chunk of data C11C to, and including, the "\r". The second chunk of data C22C includes the data after the "\r" to the end of the first chunk of data C11C. The second chunk of data C12C is also marked as an end of entry (EE). Note that the carriage return (\r) occurs at several locations 1206 (not all occurrences are labeled) in the sequence of characters that make up the first entry in the first chunk of data C11C, but the carriage return (\r) by itself does not mark the entry boundary.

Figure 13:
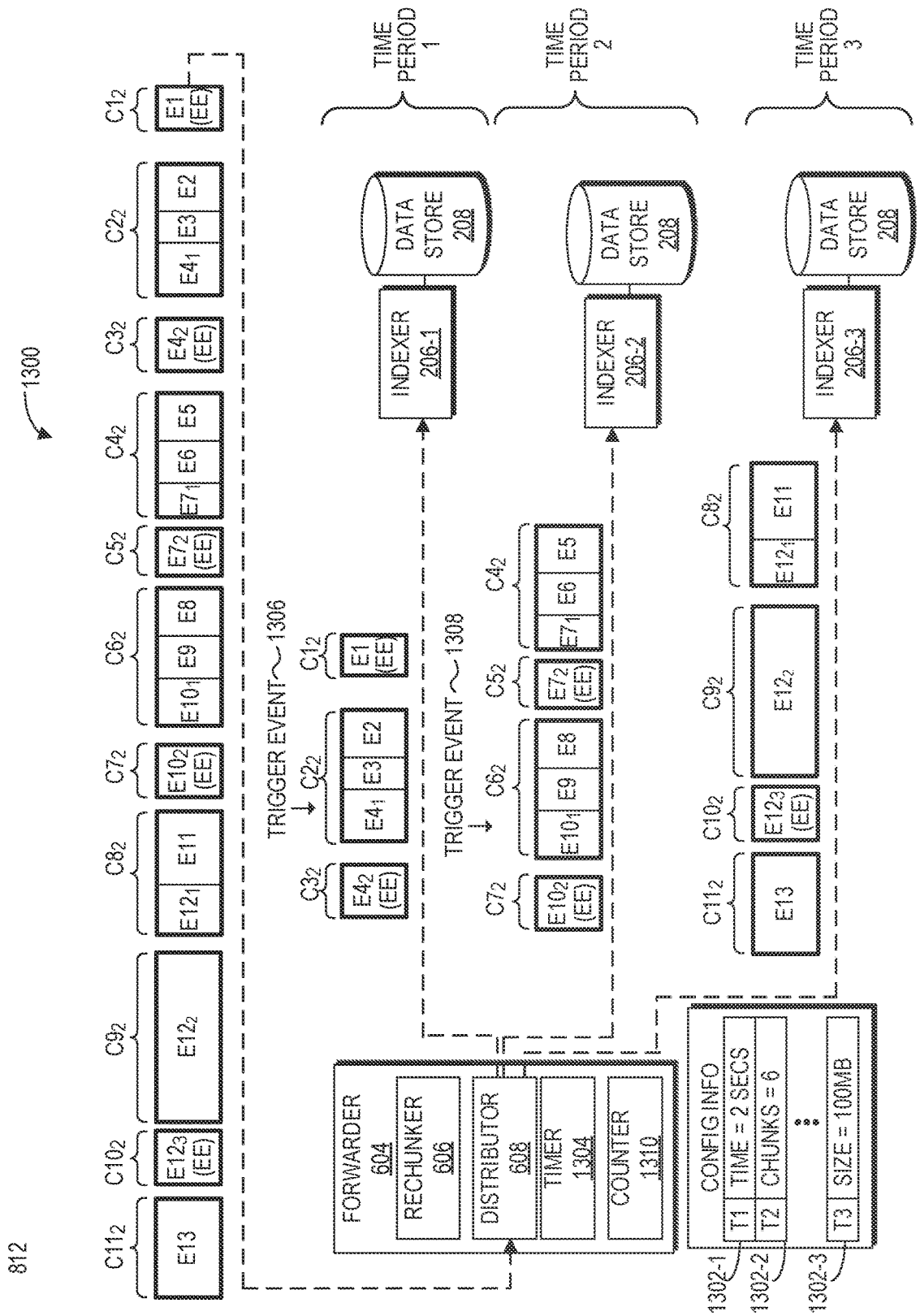
FIG. 13 is a block diagram that illustrates an example of load balancing among a set of indexers according to some embodiments.

FIG. 13 is a block diagram that illustrates an environment 1300 illustrating load balancing among a set of indexers 206 according to one embodiment. FIG. 13 illustrates an example of how the distributor 808 may load balance the second chunks of data 812 according to some embodiments. Initially, the distributor 808 may determine a trigger event that will trigger a switch from one indexer 206 to a next indexer 206. In one embodiment, the distributor 808 may access a trigger rule 1302-1 maintained in the configuration information data structure 1002. The trigger rule 1302-1 may be set by an operator or may be one of a plurality of trigger rules 1302-1-1302-3 that is selected based on some other criteria, such as the source type of the raw machine data in the second chunks of data 812, or some other criteria. The trigger rule 1302-1 identifies the elapsing of a period of time, such as, by way of non-limiting example, 10 seconds, 20 seconds, or 1 minute, as the trigger event. The trigger rule 1302-2 identifies the distribution of a predetermined number of second chunks of data 812 to a particular indexer 206 as the trigger event. The trigger rule 1302-3 identifies the distribution of a predetermined amount of data in the second chunks of data 812 to a particular indexer 206 as the trigger event.

In a first example, assume that the distributor 808 accesses the trigger rule 1302-1 and sets a timer 1304 to the period of time identified in the trigger rule 1302-1, which in this example is 2 seconds. The distributor 808 then accesses the second chunks of data 812 and begins distributing the second chunks of data 812 to the first indexer 206-1. The distributor 808 first distributes the second chunk C12 to the first indexer 206-1. The distributor 808 then accesses the second chunk C22, and determines the occurrence of a trigger event 1306. In particular, the distributor 808 determines that the timer 1304 has expired. Assume for purposes of illustration that the distributor 808 has not yet distributed the second chunk C22. The distributor 808 analyzes the second chunk C22 and determines that the second chunk C22 is not an end of entry (EE). The distributor 808 distributes the second chunk C22 to the current indexer, the first indexer 206-1. The distributor 808 accesses the next second chunk C32 and determines that the second chunk C32 is an end of entry (EE). The distributor 808 distributes the second chunk C32 to the current indexer, the first indexer 206-1. Because the second chunk C32 is an end of entry, the next second chunk C42 begins on an entry boundary, and the distributor 808 can distribute the next second chunk C42 to a new indexer 206, in this example the second indexer 206-2. The distributor 808 may also reset the timer 1304 to two seconds.

The distributor 808 accesses the second chunk C52 and distributes the second chunk C52 to the second indexer 206-2. The distributor 808 then accesses the second chunk C62 and determines the occurrence of a trigger event 1308. In particular, the distributor 808 determines that the timer 1304 has expired. Assume for purposes of illustration that the distributor 808 has not yet distributed the second chunk C62. The distributor 808 analyzes the second chunk C62 and determines that the second chunk C62 is not an end of entry (EE). The distributor 808 distributes the second chunk C62 to the current indexer, the second indexer 206-2. The distributor 808 accesses the second chunk C72 and determines that the second chunk C72 is an end of entry (EE). The distributor 808 distributes the second chunk C72 to the current indexer, the second indexer 206-2. Because the second chunk C72 is an end of entry, the distributor 808 can access the next second chunk C82, which begins on an entry boundary, and distribute the next second chunk C82 to a new indexer, in this example the third indexer 206-3. The distributor 808 may also reset the timer 1304 to two seconds. This process may continue until the distributor 808 has processed all the second chunks of data 812.

For purposes of illustration, assume that, instead of the trigger rule 1302-1, the distributor 808 had accessed the trigger rule 1302-2. The trigger rule 1302-2 identifies the distribution of a predetermined number of second chunks of data 812 to a particular indexer 206 as the trigger event. Thus, in this example, the distributor 808 may maintain a counter 1310 and increment the counter 1310 each time the distributor 808 distributes a second chunk of data 812 to a particular indexer 206. When the counter 1310 meets or exceeds the threshold value, in this case six, the distributor 808 determines the occurrence of a trigger event. The distributor 808 then switches to the next indexer 206 after sending a second chunk of data 812 that is marked as an end of entry to the current indexer 206.

Similarly, for purposes of illustration, assume that, instead of the trigger rules 1302-1, 1302-2, the distributor 808 had accessed the trigger rule 1302-3. The trigger rule 1302-3 identifies a predetermined amount of data in the second chunks of data 812 distributed to a particular indexer 206 as the trigger event. In this example, the amount of data is 100 megabytes (MB). The distributor 808 may maintain the counter 1310 and increment the counter 1310 with the amount of data, such as the size of the second chunk of data 812 in bytes, each time the distributor 808 distributes a second chunk of data 812 to a particular indexer 206. When the counter 1310 meets or exceeds the threshold value, in this case 100 MB, the distributor 808 determines the occurrence of a trigger event. The distributor 808 then switches to the next indexer 206 after sending a second chunk of data 812 that is marked as an end of entry to the current indexer 206.

Figure 14:
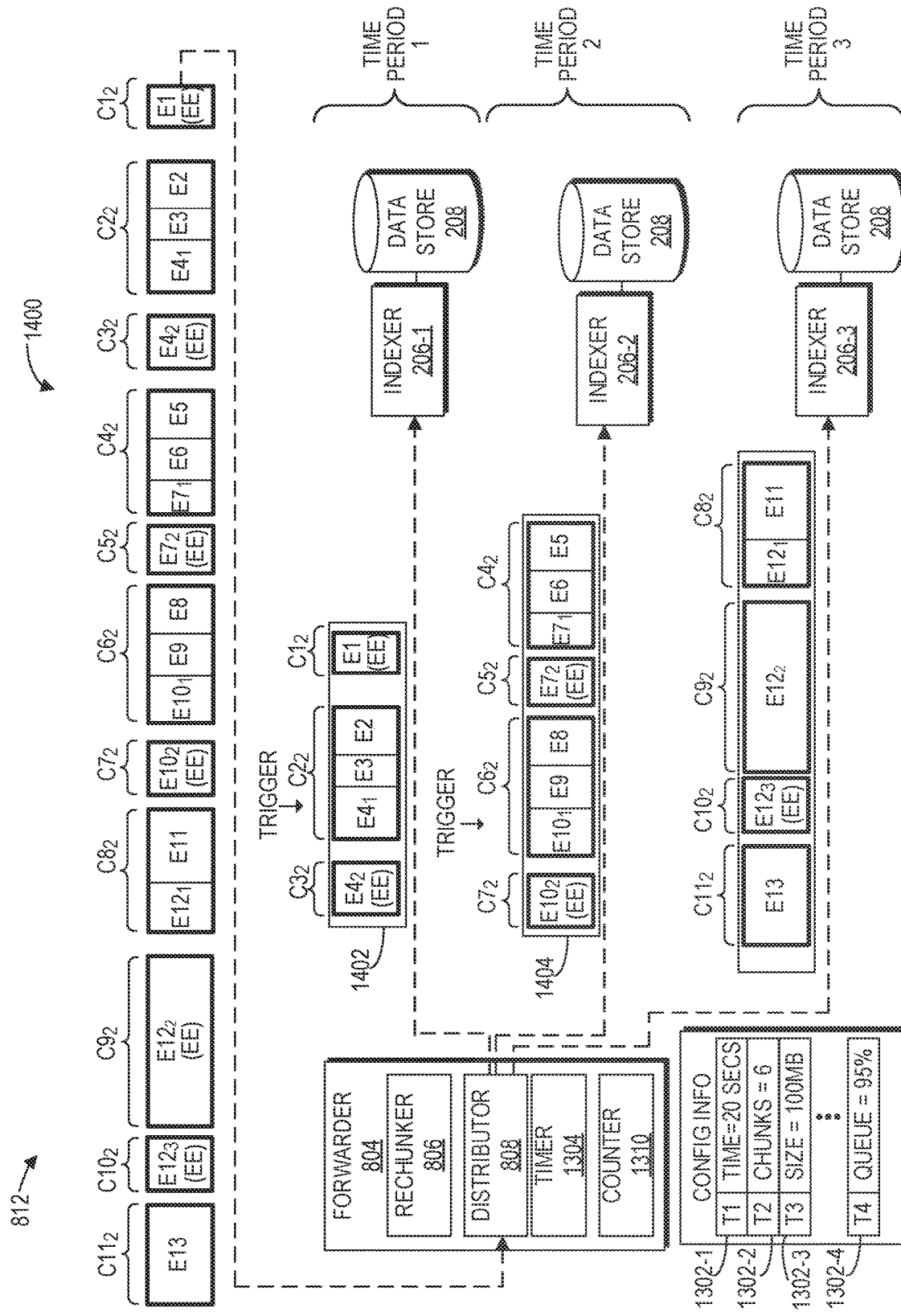
FIG. 14 is a block diagram that illustrates an environment illustrating load balancing among a set of indexers according to another embodiment.

FIG. 14 is a block diagram of an environment 1400 illustrating load balancing among the set of indexers 206 according to another embodiment. In this embodiment, the distributor 808 distributes the second chunks of data 812 to the indexer 206-1 via insertion of the second chunks of data 812 into an output queue 1402. The indexer 206-1 retrieves a second chunk of data 812 from the front of the output queue 1402 and processes the second chunk of data 812. When finished processing the second chunk of data 812, the indexer 206-1 retrieves the next second chunk of data 812 from the front of the output queue 1402. The distributor 808 monitors the output queue 1402, and determines the occurrence of a trigger event if the output queue 1402 reaches a particular fullness that indicates that the indexer 206-1 has reached a maximum capacity. In some embodiments, the particular fullness may be defined by a trigger rule, such as a trigger rule 1302-4. Upon the occurrence of the trigger event, the indexer 206-1 processes the second chunks of data 812 until a second chunk of data 812 marked as an end of entry is located, and after such second chunk of data 812 is located, the distributor 808 begins distributing the second chunks of data 812 to the second indexer 206-2 via an output queue 1404.

Figure 15:
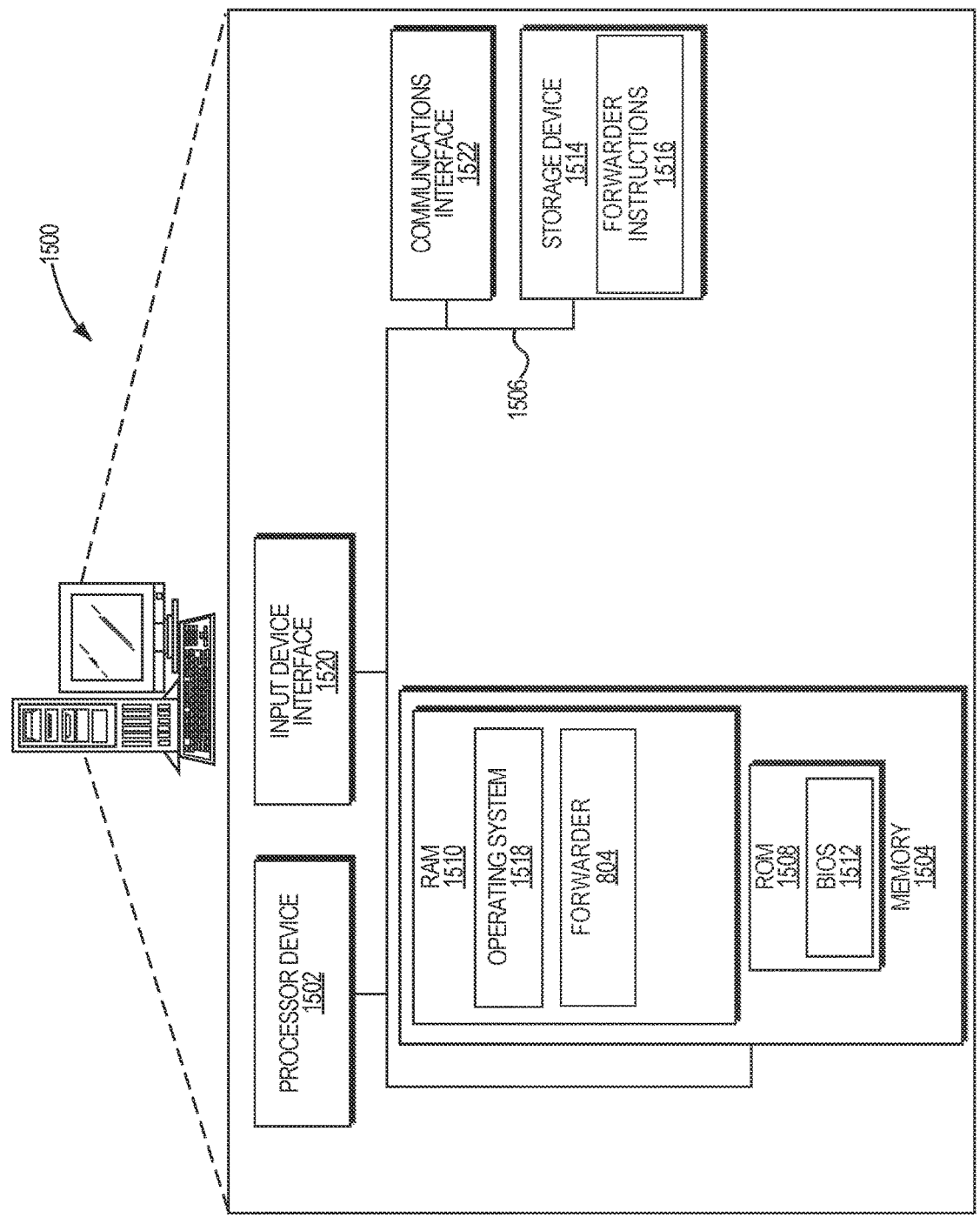
FIG. 15 is a block diagram that illustrates a computing device according to one embodiment.

FIG. 15 is a block diagram of a computing device 1500 according to one embodiment. In some embodiments, the forwarder 804 may comprise software instructions which, when executed by at least one processor device, cause the computing device 1500 to implement at least portions of the functionality described herein with respect to the forwarder 804. The computing device 1500 may comprise any computing or electronic device capable of including firmware, hardware, and/or executing software instructions to implement the functionality described herein, such as a computer server, a desktop computing device, a laptop computing device, or the like. The computing device 1500 includes a processor device 1502, a system memory 1504, and a system bus 1506. The system bus 1506 provides an interface for system components including, but not limited to, the system memory 1504 and the processor device 1502. The processor device 1502 can be any commercially available or proprietary processor.

The system bus 1506 may be any of several types of bus structures that may further interconnect to a memory bus (with or without a memory controller), a peripheral bus, and/or a local bus using any of a variety of commercially available bus architectures. The system memory 1504 may include non-volatile memory 1508 (e.g., read-only memory (ROM), erasable programmable read-only memory (EPROM), electrically erasable programmable read-only memory (EEPROM), etc.), and volatile memory 1510 (e.g., random-access memory (RAM)). A basic input/output system (BIOS) 1512 may be stored in the non-volatile memory 1508 and can include the basic routines that help to transfer information between elements within the computing device 1500. The volatile memory 1510 may also include a high-speed RAM, such as static RAM, for caching data.

The computing device 1500 may further include or be coupled to a non-transitory computer-readable medium such as a storage device 1514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1514 and other drives associated with computer-readable media and computer-usable media may provide non-volatile storage of data, data structures, computer-executable instructions, including computer-executable instructions 1516 associated with the forwarder 804 and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed embodiments.

A number of processes can be stored in the storage device 1514 and in the volatile memory 1510, including an operating system 1518 and one or more program modules, such as the forwarder 804, which may implement the functionality described herein in whole or in part. It is to be appreciated that the embodiments can be implemented with various commercially available operating systems 1518 or combinations of operating systems 1518.

All or a portion of the embodiments may be implemented as a computer program product stored on a transitory or non-transitory computer-usable or computer-readable storage medium, such as the storage device 1514, which includes complex programming instructions, such as complex computer-readable program code, to cause the processor device 1502 to carry out the steps described herein. Thus, the computer-readable program code can comprise software instructions for implementing the functionality of the embodiments described herein when executed on the processor device 1502. The processor device 1502, in conjunction with the forwarder 804 in the volatile memory 1510, may serve as a controller, or control system, for the computing device 1500 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 1502 through an input device interface 1520 that is coupled to the system bus 1506 but can be connected by other interfaces such as a parallel port, an Institute of Electrical and Electronic Engineers (IEEE) 1394 serial port, a Universal Serial Bus (USB) port, an IR interface, and the like.

The computing device 1500 may also include a communications interface 1522 suitable for communicating with a network.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   receiving, at a forwarder device, a plurality of first chunks of data comprising one or more entries that include raw data that reflects activity in an information technology environment, wherein respective chunk boundaries of the plurality of first chunks are independent of entry boundaries of the one or more entries, wherein the entry boundaries occur in at least some of the plurality of first chunks, and wherein a first entry of the one or more entries bridges at least two successive chunks in the plurality of first chunks;
   determining, at the forwarder device, based on one or more criteria for an entry boundary, a first entry boundary associated with the first entry included in a first chunk in the plurality of first chunks;
   segmenting, at the forwarder device, the first chunk into an initial second chunk and a subsequent second chunk based on the first entry boundary;
   marking, at the forwarder device, the initial second chunk as an end of entry for the first entry that bridges the at least two successive chunks;
   generating a plurality of second chunks that includes the initial second chunk and the subsequent second chunk;
   distributing a first subset of the plurality of second chunks to a first indexer of a set of indexers, wherein at least a portion of an incoming query is processed by the first indexer based on at least a portion of the first subset of the plurality of second chunks; and
   switching, based at least in part on detecting that the first subset of the plurality of second chunks includes the initial second chunk that is marked as the end of entry, to distribute a second subset of the plurality of second chunks that begins at the subsequent second chunk to a second indexer of the set of indexers.

2. The method of claim 1, wherein at least one of the one or more criteria comprises a source type associated with the plurality of first chunks.

3. The method of claim 1, wherein at least one of the one or more criteria comprises a source of the raw data.

4. The method of claim 1, wherein at least one of the one or more criteria comprises a textual pattern, and determining the first entry boundary comprises matching the textual pattern with data in the first chunk.

5. The method of claim 1, further comprising:
   determining a source type of the plurality of first chunks; and
   accessing an entry boundary rule of a plurality of different entry boundary rules based on the source type, wherein the entry boundary rule includes at least one of the one or more criteria.

6. The method of claim 1, wherein each second chunk of the plurality of second chunks begins or ends on a different entry boundary.

7. The method of claim 1, wherein distributing the first subset of the plurality of second chunks to the first indexer comprises inserting successive second chunks included in the plurality of second chunks into an output queue associated with the first indexer.

8. The method of claim 1, wherein at least some of the one or more entries comprise different lengths.

9. The method of claim 1, wherein receiving the plurality of first chunks comprises receiving a file comprising the plurality of first chunks, wherein each first chunk comprises a block of data from the file.

10. One or more non-transitory computer readable media storing instructions that, when executed by one or more processors, cause the one or more processors to perform the steps of:
    receiving, at a forwarder device, a plurality of first chunks of data comprising one or more entries that include raw data that reflects activity in an information technology environment, wherein respective chunk boundaries of the plurality of first chunks are independent of entry boundaries of the one or more entries, wherein the entry boundaries occur in at least some of the plurality of first chunks, and wherein a first entry of the one or more entries bridges at least two successive chunks in the plurality of first chunks;
    determining, at the forwarder device, based on one or more criteria for an entry boundary, a first entry boundary associated with the first entry included in a first chunk in the plurality of first chunks;
    segmenting, at the forwarder device, the first chunk into an initial second chunk and a subsequent second chunk based on the first entry boundary;
    marking, at the forwarder device, the initial second chunk as an end of entry for the first entry that bridges the at least two successive chunks;

generating a plurality of second chunks that includes the initial second chunk and the subsequent second chunk;

distributing a first subset of the plurality of second chunks to a first indexer of a set of indexers, wherein at least a portion of an incoming query is processed by the first indexer based on at least a portion of the first subset of the plurality of second chunks; and switching, based at least in part on detecting that the first subset of the plurality of second chunks includes the initial second chunk that is marked as the end of entry, to distribute a second subset of the plurality of second chunks that begins at the subsequent second chunk to a second indexer of the set of indexers.

11. The one or more non-transitory computer readable media of claim 10, wherein at least one of the one or more criteria comprises a source type associated with the plurality of first chunks.

12. The one or more non-transitory computer readable media of claim 10, wherein at least one of the one or more criteria comprises a source of the raw data.

13. The one or more non-transitory computer readable media of claim 10, wherein at least one of the one or more criteria comprises a textual pattern, and determining the first entry boundary comprises matching the textual pattern with data in the first chunk.

14. The one or more non-transitory computer readable media of claim 10, further comprising:

determining a source type of the plurality of first chunks; and accessing an entry boundary rule of a plurality of different entry boundary rules based on the source type, wherein the entry boundary rule includes at least one of the one or more criteria.

15. The one or more non-transitory computer readable media of claim 10, wherein each second chunk of the plurality of second chunks begins or ends on a different entry boundary.

16. The one or more non-transitory computer readable media of claim 10, wherein distributing the first subset of the plurality of second chunks to the first indexer comprises inserting successive second chunks included in the plurality of second chunks into an output queue associated with the first indexer.

17. The one or more non-transitory computer readable media of claim 10, wherein at least some of the one or more entries comprise different lengths.

18. The one or more non-transitory computer readable media of claim 10, wherein receiving the plurality of first chunks comprises receiving a file comprising the plurality of first chunks, wherein each first chunk comprises a block of data from the file.

19. A computer-system, comprising:

one or more memories storing instructions; and one or more processors for executing the instructions to:

receive, at a forwarder device, a plurality of first chunks of data comprising one or more entries that include raw data that reflects activity in an information technology environment, wherein respective chunk boundaries of the plurality of first chunks are independent of entry boundaries of the one or more entries, wherein the entry boundaries occur in at least some of the plurality of first chunks, and wherein a first entry of the one or more entries bridges at least two successive chunks in the plurality of first chunks;

determine, at the forwarder device, based on one or more criteria for an entry boundary, a first entry boundary associated with the first entry included in a first chunk in the plurality of first chunks;

segment, at the forwarder device, the first chunk into an initial second chunk and a subsequent second chunk based on the first entry boundary;

mark, at the forwarder device, the initial second chunk as an end of entry for the first entry that bridges the at least two successive chunks;

generate a plurality of second chunks that includes the initial second chunk and the subsequent second chunk;

distribute a first subset of the plurality of second chunks to a first indexer of a set of indexers, wherein at least a portion of an incoming query is processed by the first indexer based on at least a portion of the first subset of the plurality of second chunks; and switch, based at least in part on detecting that the first subset of the plurality of second chunks includes the initial second chunk that is marked as the end of entry, to distribute a second subset of the plurality of second chunks that begins at the subsequent second chunk to a second indexer of the set of indexers.

20. The system of claim 19, wherein the one or more processors execute the instructions to:

determine a source type of the plurality of first chunks; and access an entry boundary rule of a plurality of different entry boundary rules based on the source type, wherein the entry boundary rule includes at least one of the one or more criteria.

* * * * *